Sept. 12, 1939.	T. C. SAYLES	2,172,774
HUB BRAKE FOR VELOCIPEDES
Filed Feb. 2, 1938	3 Sheets—Sheet 1
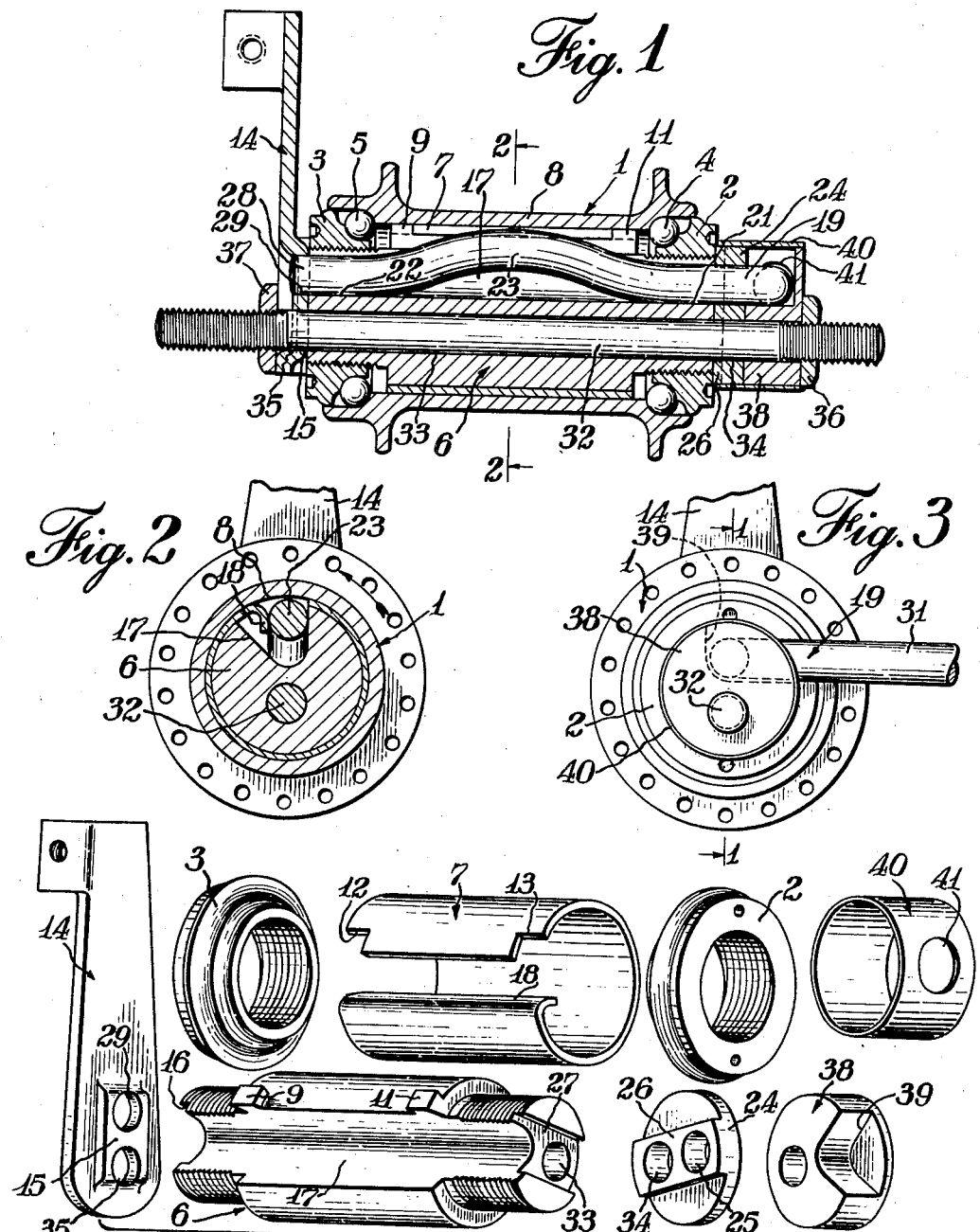
Witness:
Burr W. Jones
INVENTOR.
Theo C. Sayles
BY Clinton L. Jones
ATTORNEY.

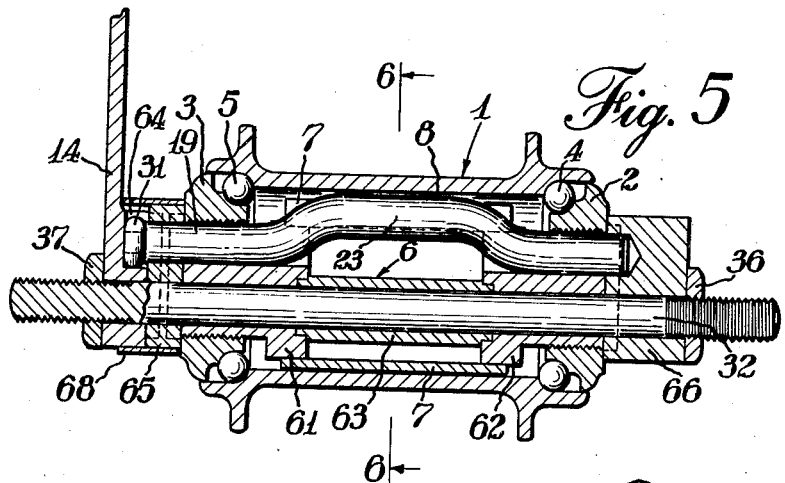
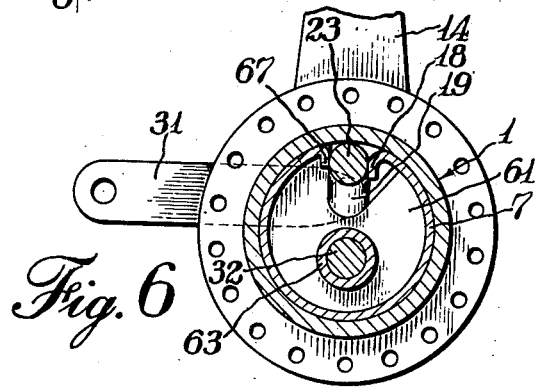
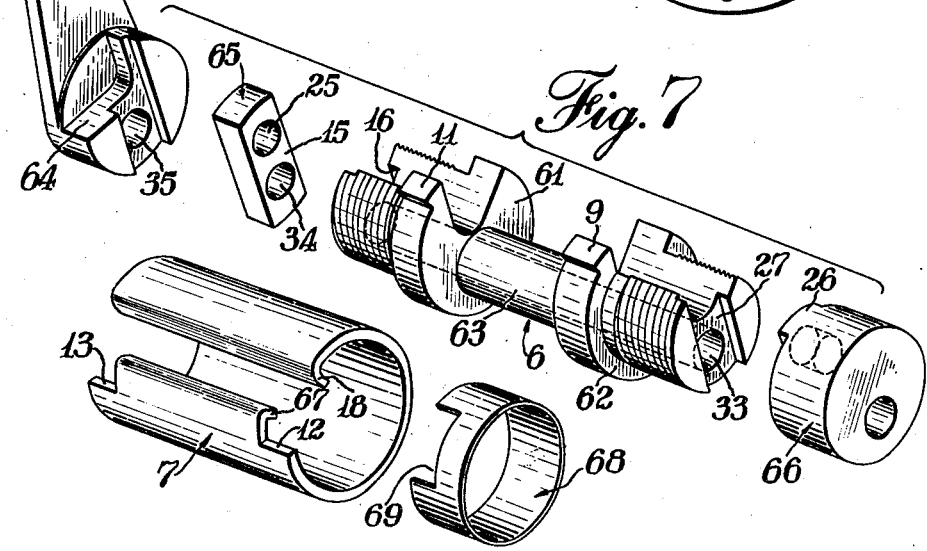

Sept. 12, 1939. T. C. SAYLES 2,172,774
HUB BRAKE FOR VELOCIPEDES
Filed Feb. 2, 1938 3 Sheets-Sheet 3
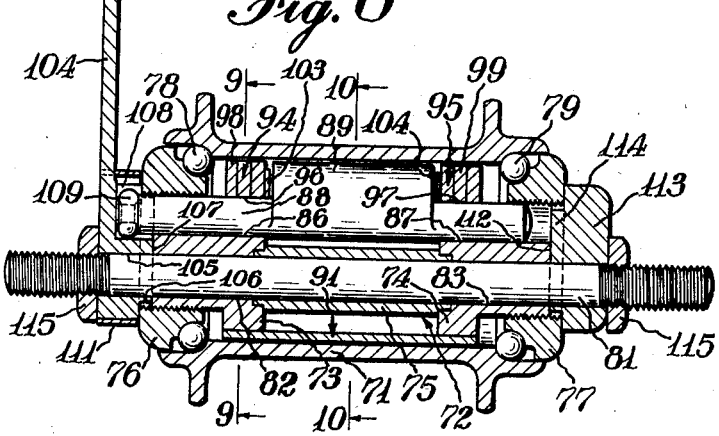
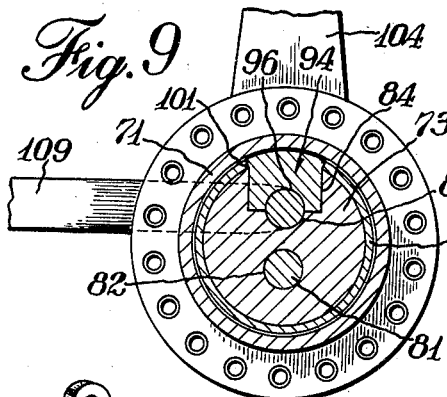 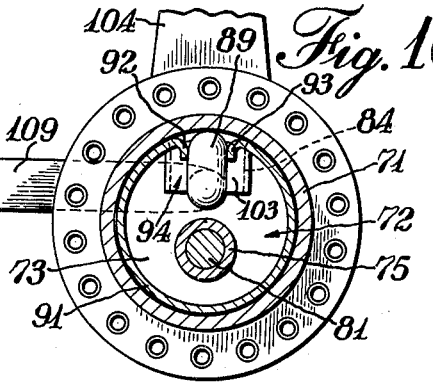
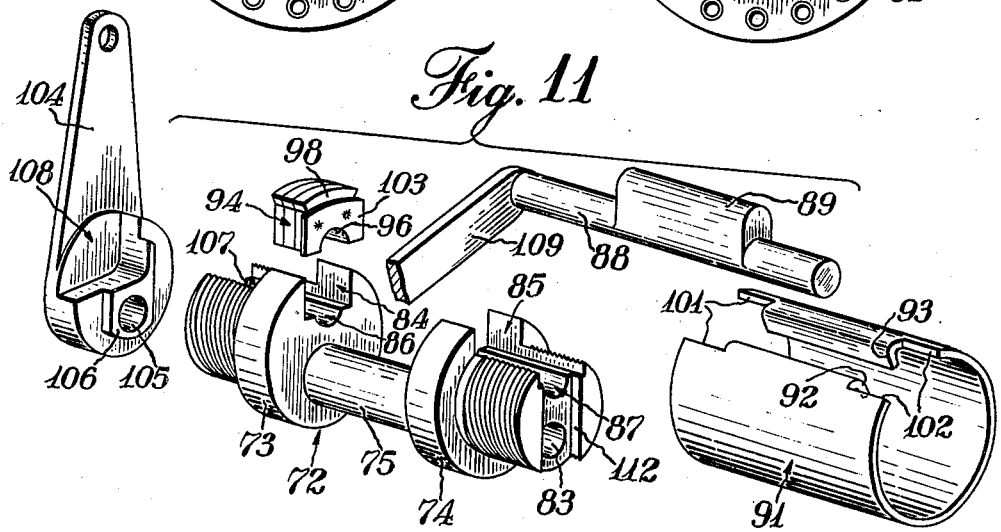
Witness:
Burr W. Jones
INVENTOR.
BY Theo C. Sayles
Clinton S. James
ATTORNEY.

Patented Sept. 12, 1939

2,172,774

UNITED STATES PATENT OFFICE 2,172,774

HUB BRAKE FOR VELOCIPEDES

Theo. C. Sayles, Elmira, N. Y., assignor, by mesne assignments, to Bendix Aviation Corporation, South Bend, Ind., a corporation of Delaware Application February 2, 1938, Serial No. 188,337

11 Claims. (Cl. 188—26)

The present invention relates to a hub brake for velocipedes, and more particularly to a brake of the sleeve type especially adapted for manual, as distinguished from pedal, operation to control the rotation of the wheels of bicycles and the like.

It is an object of the present invention to provide a wheel brake for velocipedes and the like which is effective in action, rugged in construction and susceptible to easy and positive control.

It is another object to provide such a device particularly adapted to control the rotation of bicycle wheels, which incorporates an especially efficient type of manually operable control mechanism.

It is a further object to provide such a device in which braking effects of any desired magnitude are readily obtainable by the exertion of moderate controlling forces, without the liability of jamming or locking up of the parts.

It is another object to provide such a device in which the braking element is in the form of a cylinder having a full surface contact with the inner surface of the wheel hub.

It is another object to provide such a device in which the braking element may optionally be arranged to be self-energizing or non-self-energizing in its action.

It is another object to provide such a device which may be incorporated in a hub of comparatively small size, and which involves no parts projecting axially beyond the mounting fork of the wheel and consequently subject to breakage through careless handling of the bicycle.

Further objects and advantages will be apparent from the following description taken in connection with the accompanying drawings in which:

Fig. 1 is a longitudinal sectional view taken substantially on the line 1—1 of Fig. 3, of a preferred embodiment of the invention as applied to a bicycle hub of conventional type;

Fig. 2 is a transverse section taken substantially on the line 2—2 of Fig. 1;

Fig. 3 is an end view of the device from the right in Fig. 1;

Fig. 4 is a perspective view of the various braking elements shown in disassembled relation;

Fig. 5 is a view similar to Fig. 1 showing a somewhat modified embodiment of the invention;

Fig. 6 is a sectional view taken substantially on the line 6—6 of Fig. 5;

Fig. 7 is a perspective view of the parts of the brake illustrated in Figs. 5 and 6, in disassembled relation;

Fig. 8 is a view similar to Fig. 1 of a third embodiment of the invention;

Fig. 9 is a section taken substantially on the line 9—9 of Fig. 8;

Fig. 10 is a section taken substantially on the line 10—10 of Fig. 8; and

Fig. 11 is a perspective view of certain of the elements illustrated in Fig. 8, shown in disassembled relation.

In the embodiment of the invention illustrated in Fig. 1, numeral 1 indicates a cylindrical wheel hub of conventional type with bearing cones 2 and 3 mounted in its ends and cooperating with balls 4 and 5 to form anti-friction bearings for the hub. The bearing cones 2 and 3 are threaded on the opposite ends of a supporting and aligning body member 6 illustrated in detail in Fig. 4, and an elastic cylindrical split sleeve brake member 7 is mounted therebetween on the supporting member 6 within the smooth cylindrical portion 8 of the hub.

The supporting member 6 serves also as an anchor member for the brake sleeve 7, and for this purpose is provided with lugs 9 and 11 arranged to engage in notches 12 and 13 respectively provided in one edge of the brake sleeve. Member 6 is prevented from rotation by an interlocking connection with an anchor arm 14 which is fixed in any suitable way to the frame of the vehicle such as a bicycle in which the wheel is to be mounted. As here shown, this interlocking connection consists of a projection 15 formed on the anchor arm 14 in any suitable manner, having flattened sides arranged to engage in a transverse channel 16 formed in the end of the member 6.

According to the present invention, means are provided for applying pressure to the free end of the brake sleeve 7 in order to expand it into frictional engagement with the interior of the hub 1. As herein disclosed, this is accomplished by forming a longitudinal groove 17 in the member 6, bending inwardly the free edge of the brake sleeve 7 to form a flange 18 extending into the groove 17, and providing a manually operable crank member indicated generally by numeral 19 for applying pressure to the flange 18 to expand the brake. As here shown, crank 19 comprises a generally cylindrical rod or bar journalled at 21 and 22 in the ends of the groove 17 of member 6 and having an intermediate offset portion 23 acting as a crank throw to engage the flange 18 of the brake member.

Crank 19 is maintained in its seat 21 by means of a mounting member 24 (Fig. 4) having an opening 25 to receive the crank and non-rotatably connected to the member 6 by means of a lug 26 with flattened sides engaging in a channel 27 of the member 6. In order to maintain the opposite end 28 of the crank in its seat 22, an opening 29 is formed in the anchor member 14 to receive the end of the crank. A handle 31 is provided for the crank which may be operated manually or in any other suitable manner.

The parts are held in assembled relation by means of a stationary axle member 32 traversing an opening 33 in the member 6 and openings 34 and 35 in the mounting member 24 and anchor member 14. Nuts 36 and 37 are threaded on the ends of the axle 32 to clamp the parts together, a spacing member 38 being mounted on the axle adjacent the nut 36 to accommodate the arm 31 of lever 19 and permit swinging motion thereof by virtue of the flaring recess 39 formed in said spacer. The recess 39 is preferably closed for the exclusion of foreign matter by suitable means such as a thimble 40 rotatably mounted on the spacer 38 and having an opening 41 for the handle 31 of crank 19.

In the operation of the device, it will be understood that the assembly is mounted in the usual manner in the forks of a velocipede such as a bicycle or the like, the anchoring arm 14 being attached to the adjacent fork member to prevent rotation thereof. Swinging movement of the crank 19 in a counter-clockwise direction as illustrated in Figs. 2 and 3 then applies pressure to the flange 18 of the brake member 7, causing the brake to expand into frictional engagement with the interior of the hub 1. During such operation, rotation of the sleeve 7 is prevented by the engagement of the lugs 9 and 11 of the member 6 in the notches 12 and 13 of the sleeve, so that the braking reaction is transferred from the sleeve through the member 6 to the anchor arm 14.

It will be understood that if the hub 1 is turning in a counterclockwise direction as indicated by the arrow in Fig. 2, the brake 7 is self-energizing in its action in that the braking forces tend to cause the sleeve to expand into the hub. If such self-energizing action is not desired, it is merely necessary to reverse the position of the sleeve and member 6 whereby the controlling action through the crank will be reversed, and the braking reaction will operate in a direction to release the brake.

The embodiment of the invention illustrated in Figs. 5 to 7 is substantially similar to that first described, but the structure is somewhat modified and simplified as regards manufacturing operations.

In this form of the invention, the supporting member 6 is built up of two end members 61 and 62 with a tubular intermediate member 63 suitably fixed thereto as by welding. The parts of this member are thus readily capable of manufacture on automatic machine tools.

It will also be noted that the crank 19 has been reversed so that the handle 31 thereof is now on the same side of the hub as the anchor arm 14 and is angularly movable in a recess 64 in said anchor arm. A spacing and retaining member 65 is preferably provided for non-rotatably connecting the member 61 to the anchor arm 14 and for retaining the crank 19 in its seat in the member 61. A retaining member 66 is provided for holding the free end of the crank 19 in its seat in the member 62.

Since in this form of the invention the brake sleeve 7 is not supported internally except at its ends, an inturned flange 67 is preferably formed on the anchored end of the sleeve in order to stiffen it.

The recess 64 in anchor arm 14 is preferably closed by a thimble 68 rotatably mounted on said arm and provided with a notch 69 to accommodate the handle 31 of crank 19.

In this embodiment of the invention, the offset portion 23 of crank 19 is straightened and extended axially so as to engage the flange 18 over most of the length of the brake sleeve 7 and thus distribute the expansive force over the entire surface of the sleeve. In so forming the crank, however, the radii of the curved portions thereof are kept sufficiently long to permit sliding the mounting member 65 onto the crank without the necessity of forming the opening 25 therein appreciably larger than the diameter of the crank. The remaining parts of this embodiment of the invention are the same as in that first described and are similarly numbered.

In the embodiment of the invention illustrated in Figs. 8 to 11 of the drawings, the structure has been still further simplified and reduced in size.

In Fig. 8 the cylindrical hub 71 has a bearing supporting or body member indicated generally by numeral 72 mounted therein, which member is constructed as best seen in Fig. 11 of two end portions 73 and 74 connected by a tubular portion 75 which is preferably welded thereto. Bearing cones 76 and 77 are threaded on the parts 73 and 74 of the bearing member 72 for receiving the hub bearing balls 78 and 79.

An axle member 81 traverses aligned openings 82 and 83 in the parts 73 and 74, and the tubular portion 75, and is adapted to be fixedly mounted in the frame of the vehicle, not illustrated.

Parts 73 and 74 of bearing member 72 are provided with aligned radial slots 84 and 85 (Fig. 11) having semi-cylindrical journals 86 and 87 formed at the bottoms thereof for the reception of an operating shaft 88 having a laterally offset crank portion 89 located between the parts 73 and 74. A split brake sleeve 91 is mounted at its ends on the parts 73 and 74 of the bearing member 72 and is provided with inturned flanges at 92 and 93 on opposite sides of the crank portion 89 of the shaft 88 as best seen in Fig. 10.

Means for retaining the operating shaft 88 in its bearings, and for anchoring the brake sleeve 91 against rotation is provided in the form of anchor members 94 and 95 seated in the slots 84 and 85 and having semi-cylindrical journal portions 96 and 97 receiving the shaft 88. Anchor members 94 and 95 extend radially beyond the surface of parts 73 and 74, the arcuate extending portions 98 and 99 being arranged to engage the shoulders 101 and 102 formed in the ends of the brake sleeve 91 beyond the flanges 92 and 93 thereof, and thus anchor the brake sleeve against rotation.

The anchor members 94 and 95 are preferably formed of laminations or stampings welded together as indicated, and end plates 103 and 104 are fixed thereto in any suitable way as by means of spot welding. The end plates 103 and 104 extend laterally beyond the slots 84 and 85 and prevent longitudinal movement of the anchor members 94 and 95 away from the center of the hub. These end plates are formed peripherally of the same diameter as the inside of the brake sleeve 91 so that the edges of the brake sleeve extend over the edges of the end plates and retain them, and consequently the anchor members 94 and 95, against radially outward movement in the slots 84 and 85.

Rotation of the bearing body member 72 is prevented by means of an anchor member 104 having an opening 105 to receive the axle 81 and having a flattened projecting portion 106 adapted to be received in a diametral channel 107 formed in the end of the part 73 of the bearing member 72 so as to non-rotatably connect the body member to the anchor member. It will be understood that the anchor member 104 is fixedly mounted in the frame of the vehicle, not illustrated, in any suitable manner.

Anchor member 104 is provided with an angular cut-out portion 108 adapted to receive the operating arm 109 of the brake shaft 88 and permit swinging movement of the arm to control the application of the brake. This opening 108 is preferably closed by a sleeve 111 slidably mounted on the exterior of the anchor member 104 and having a slot loosely fitting the arm 109.

The part 74 of the bearing body member 72 is also provided with a terminal channel 112, and a spacing and bearing locking member 113 having a corresponding projection 114 is mounted on the axle 81 and maintained in engagement with the bearing member by suitable means such as a clamp nut 115, whereby the bearing cone 77 is anchored against rotation by its engagement with the bearing locking member 113.

In the operation of this embodiment of the invention, swinging movement of the brake operating arm 109 causes rotation of the brake shaft 88 whereby the cam 89 engages one or the other of the flanges 92 or 93 of the brake sleeve 91, depending on the direction of motion of the brake operating arm 109. Rotation of the brake sleeve 91 is prevented by the anchor members 94 and 95 engaging the shoulders 101 and 102 of said sleeve so that the cam 89 is caused to expand the brake sleeve 91 and bring it into frictional engagement with the interior of the hub 71. It will be understood that the action of the brake is the same, due to its symmetrical construction, whichever way the arm 109 is arranged to move in applying the brake. It is thus possible to secure servo action of the brake or to avoid such action merely by arranging the parts to provide for actuation of the arm 109 in the proper direction.

It will be seen that there is here provided an arrangement in which a braking member having substantially full surface contact with the interior of a hub is provided with a direct and positive control having a high mechanical advantage as well as high efficiency and freedom from lost motion.

Although certain embodiments of the invention have been shown and described in detail, it will be understood that other embodiments are possible and various changes may be made in the design and arrangements of the parts without departing from the spirit of the invention as defined in the claims appended hereto.

What is claimed is:

1. In combination with a wheel hub, a supporting member journalled therein, an expanding sleeve brake for said hub including a split cylindrical brake element, means for anchoring one longitudinal edge of the brake cylinder to the supporting member, and means for applying tangential pressure to the free edge thereof including a crankshaft journalled at its ends within the supporting member, and having an intermediate laterally bowed portion engaging the free edge of the brake sleeve.

2. In combination with a cylindrical wheel hub, a supporting member therein, a stationary axle traversing said supporting member, anchoring means preventing rotation of the supporting member, a longitudinally split brake sleeve in the hub having one edge anchored on said supporting member, a control shaft journalled at its ends in said supporting member, having an intermediate portion engaging the free edge of the brake sleeve, and manually operable means for oscillating the control shaft to expand the brake sleeve into frictional engagement with the interior of the hub.

3. In combination with a cylindrical wheel hub, a supporting member therein, a stationary axle traversing said supporting member eccentrically thereof, anchoring means preventing rotation of the supporting member, a longitudinally split brake sleeve in the hub having one edge anchored on said supporting member, a control shaft journalled at its ends in said supporting member parallel to the axle, having an intermediate laterally extended portion engaging the free edge of the brake sleeve, and manually operable means for oscillating the control shaft to expand the brake sleeve into frictional engagement with the interior of the hub.

4. In combination with a cylindrical wheel hub, bearing members for the ends thereof, means including a stationary axle spacing and aligning said bearing members, and preventing rotation thereof, an expansible sleeve anchored on said bearing means, a shaft journalled in said bearing members and having a laterally offset portion engaging a longitudinal edge of the sleeve, and manually operable means for oscillating the shaft to expand the sleeve.

5. In combination with a cylindrical wheel hub, a supporting member therein, a fixed axle supported thereby, an expansible brake sleeve anchored to said supporting member, said supporting member being slotted to provide a seat, a control shaft mounted in said seat and having a laterally extending portion engaging the brake sleeve, and manually operable means for oscillating the control shaft to expand the sleeve.

6. In combination with a cylindrical wheel hub, a supporting member therein, a fixed axle supported thereby, an expansible brake sleeve anchored to said supporting member, said supporting member having a radially flared slot, a control shaft seated in said slot having a bowed portion engaging the brake sleeve, means retaining the shaft in its seat and anchoring the bearing against rotation, and manually operable means for oscillating the shaft.

7. In combination with a cylindrical wheel hub, a body member therein having a radial slot, a split brake sleeve mounted on said body member, a crank member journalled in said slot having a throw engaging one edge of the brake sleeve, and an anchor member seated in the slot, retaining the crank member in its bearing therein.

8. In combination with a cylindrical wheel hub, a body member therein having a radial slot, a split brake sleeve mounted on said body member, a crank member journalled in said slot having a throw engaging one edge of the brake sleeve, and an anchor member seated in the slot, said brake sleeve having a shoulder adapted to engage the anchor member to prevent rotation of the sleeve.

9. In combination with a cylindrical wheel hub, a body member therein having a radial slot, a split brake sleeve mounted on said body member, a crank member journalled in said slot having a throw engaging one edge of the brake sleeve, and an anchor member seated in the slot, retaining the crank member in its bearing therein, said brake sleeve having a shoulder adapted to engage the anchor member to prevent rotation of the sleeve and having an adjacent portion adapted to extend over a part of the anchor member and retain the anchor member in the slot.

10. In combination with a cylindrical wheel hub, a body member journalled therein including a pair of end bearing members and a tubular member spacing and uniting the end members, an anchor arm non-rotatably connected to the body member, a fixed axle traversing the body member and anchor arm, anchor blocks seated in said end members, a split brake sleeve surrounding said body member in engagement with the anchor blocks, and a manually operable crank member journalled in said body member having an offset portion adapted to engage and expand the brake sleeve into frictional engagement with the interior of the hub.

11. In combination with a cylindrical wheel hub, a body member journalled therein including a pair of end bearing members and a tubular member spacing and uniting the end members, an anchor arm non-rotatably connected to the body member, a fixed axle traversing the body member and anchor arm, anchor blocks seated in said end members, a split brake sleeve surrounding said body member in abutting engagement with the anchor blocks and serving to retain the blocks in their seats, and a manually operable crank member journalled in said body member and anchor blocks and having an offset portion adapted to engage and expand the brake sleeve into frictional engagement with the interior of the hub.

THEO. C. SAYLES.